UNITED STATES PATENT OFFICE.

THOMAS A. ROBERTSON, OF FRIENDSHIP, MARYLAND.

IMPROVEMENT IN CULTIVATORS.

Specification forming part of Letters Patent No. 18,520, dated October 27, 1857.

*To all whom it may concern:*

Be it known that I, THOS. A. ROBERTSON, of Friendship, in the county of Anne Arundel and State of Maryland, have invented an Improvement in Weeding Implements; and I do hereby declare that the following is a full, clear, and exact description of the principle or character which distinguishes it from all other things before known, and of the usual manner of making, modifying, and using the same, reference being had to the annexed drawings, of which—

Figure 1 represents a perspective view of the plow; Fig. 2, a view of the ring B, and Fig. 3 a front view of the plow.

My invention consists in an improvement in implements for weeding tobacco and other crops, described and represented as follows:

The wing B of this implement is of the peculiar form shown in Figs. 1 and 2—viz., having a straight edge, C, to which a cutter (not shown in the drawings) may be attached, if necessary. The side D extends upward and gradually curves to the rear portion, E. The landside portion F is straight and on a level with the cutter A. The edge C is inclined upward from the straight side F, so that while the cutting-edge C enters the ground the point H just skims below the surface without disturbing the roots of the plants, while the weeds are carried back over the wing and deposited in rear of the cutter in the middle of the row and clear of the plants.

I am aware that a weeding implement was patented November 18, 1851, to Henry Goldson, in which a scraper or mold-board was attached to the standard of a plow in such a way as to turn the weeds over the landside of the plow, and therefore I lay no claim to such an invention; but What I do claim is—

The curved scraper, in combination with the plow point and standard, in such manner that the weeds and sods shall be delivered in the rear of the standard, as set forth.

T. A. ROBERTSON.

C. B. Rogers,
Mortising Machine,
№ 18,521.    Patented Oct. 27, 1857.
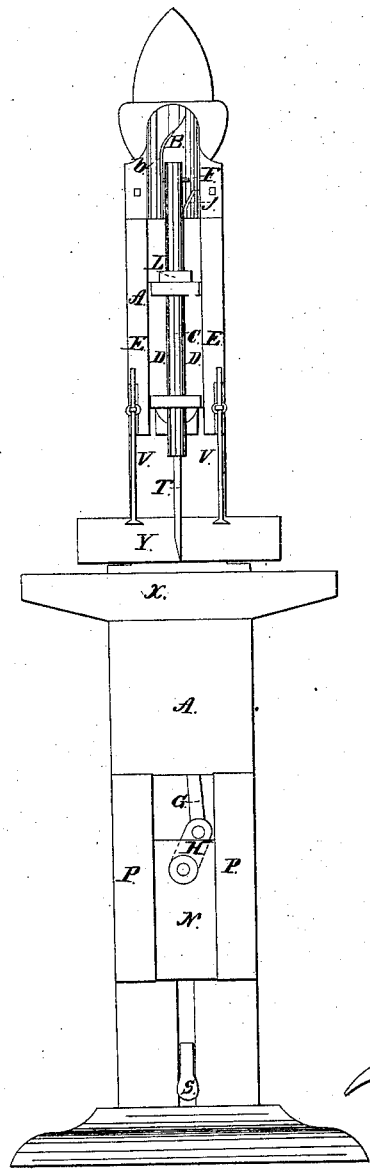
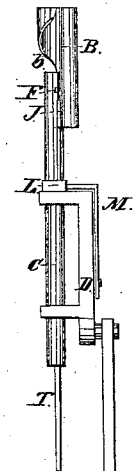
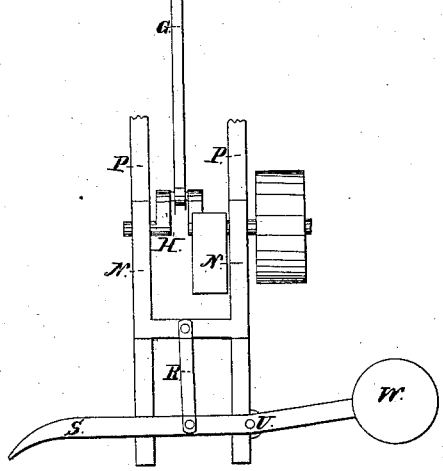

Witnesses:
 CHAS. G. PAGE,
 T. G. ROBERTSON.